United States Patent
Yagnik

(10) Patent No.: US 10,686,760 B2
(45) Date of Patent: Jun. 16, 2020

(54) METHOD AND SYSTEM FOR GENERATING DYNAMIC RULES FOR COMPUTER NETWORK FIREWALL

(71) Applicant: WIPRO LIMITED, Bangalore (IN)

(72) Inventor: Maulik Yagnik, Bangalore (IN)

(73) Assignee: Wipro Limited, Bangalore (IN)

( * ) Notice: Subject to any disclaimer, the term of this patent is extended or adjusted under 35 U.S.C. 154(b) by 280 days.

(21) Appl. No.: 15/941,006

(22) Filed: Mar. 30, 2018

(65) Prior Publication Data
US 2019/0253392 A1  Aug. 15, 2019

(30) Foreign Application Priority Data
Feb. 15, 2018  (IN) .............................. 201841005761

(51) Int. Cl.
*H04L 29/06* (2006.01)
(52) U.S. Cl.
CPC ...... *H04L 63/0263* (2013.01); *H04L 63/0236* (2013.01)
(58) Field of Classification Search
CPC .................. H04L 63/0263; H04L 63/0236
See application file for complete search history.

(56) References Cited

U.S. PATENT DOCUMENTS

| | | | | |
|---|---|---|---|---|
| 6,154,775 A * | 11/2000 | Coss | ....................... | H04L 29/06 709/221 |
| 6,996,062 B1 * | 2/2006 | Freed | ..................... | H04L 45/30 370/235 |
| 7,107,612 B1 * | 9/2006 | Xie | .......................... | H04L 12/66 726/13 |
| 2003/0053474 A1 * | 3/2003 | Tuck, III | .................. | H04L 45/00 370/422 |
| 2003/0120622 A1 * | 6/2003 | Nurmela | ............. | H04L 63/0227 706/47 |
| 2004/0037294 A1 * | 2/2004 | Yamaguchi | ......... | H04L 41/0896 370/395.42 |
| 2008/0148382 A1 * | 6/2008 | Bartholomy | ............ | H04L 12/66 726/11 |
| 2009/0172800 A1 * | 7/2009 | Wool | .................... | G06F 21/604 726/11 |
| 2009/0271857 A1 * | 10/2009 | Wang | .................. | H04L 47/2441 726/11 |
| 2010/0100949 A1 * | 4/2010 | Sonwane | .............. | H04L 63/102 726/7 |

(Continued)

*Primary Examiner* — J. Brant Murphy
(74) *Attorney, Agent, or Firm* — Finnegan, Henderson, Farabow, Garrett & Dunner, LLP

(57) ABSTRACT

Method and system for generating dynamic rules for a computer network firewall are provided. The method includes applying a plurality of drop rules to a plurality of packets that are received at a network interface. The plurality of drop rules are sequentially arranged rules and determine at least one of allowance and dropping of a packet based on corresponding tracking information. Then a unique drop rule is generated for dropping a set of packets based on an implicit deny rule. The implicit deny rule determines a drop for the plurality of packets. Thereafter, sequence for the unique drop rule in the plurality of drop rules is determined based on dropping of the plurality of packets. Accordingly, the unique drop rule is deployed in the sequence of drop rules.

17 Claims, 7 Drawing Sheets

(56) References Cited

U.S. PATENT DOCUMENTS

| | | | |
|---|---|---|---|
| 2011/0231510 A1* | 9/2011 | Korsunsky | G06F 21/55 709/213 |
| 2013/0235725 A1* | 9/2013 | Lamb | G01R 31/08 370/235 |
| 2015/0215222 A1* | 7/2015 | Johansson | H04L 47/32 370/411 |
| 2017/0244674 A1* | 8/2017 | Han | H04L 63/0263 |
| 2018/0324718 A1* | 11/2018 | Serrano | H04W 56/0015 |

* cited by examiner

METHOD AND SYSTEM FOR GENERATING DYNAMIC RULES FOR COMPUTER NETWORK FIREWALL

TECHNICAL FIELD

This disclosure relates generally to network firewall and more particularly to method and system for generating dynamic rules for computer network firewall.

BACKGROUND

Generally, network firewalls are used for providing access control at a network layer of Open System Interconnect (OSI). The network firewall maintains various policies and rules to provide allowance or dropping of incoming traffic at an interface of the network layer. The incoming traffic includes a plurality of packets. The rules are defined based on source or destination IP address(es) and/or source or destination port(s) of the incoming network traffic and accordingly lookup and permit the network traffic in a sequential manner. Further, the policies may apply a denial rule in which policy application is implicitly denied if large amount of incoming traffic is permitted and no drop situation arises. In such a case, a deny policy is applied to deny further rule application and allow the remaining network traffic.

In above stated scenarios, the network firewall may be vulnerable to attacks. In sequential processing feature when a relevant policy is positioned towards the end in the sequence, it may result in delay in processing of relevant packets in the incoming traffic. Further, the network firewall may receive attacks by hacking programs due to a deny policy. Such programs may send large incoming traffic that matches the policies and then harmful packets after the deny policy.

Some conventional methods involve improved firewall for providing network security. The improved firewall may provide dynamic rule generation along with conventional fixed rules. However, such methods may not utilize feedback mechanism to create new rules for implicitly denied packets. Further, such methods do not rely on dynamic ordering of the new rules. Therefore, such methods may not utilize the new rules robustly and may result in discarding the new rule.

SUMMARY

In one embodiment, a method for generating dynamic rules for a network firewall, is provided. The method includes applying a plurality of drop rules to a plurality of packets that are received at a network interface. The plurality of drop rules are sequentially arranged rules and such rules determine at least one of allowance and dropping of a packet based on corresponding tracking information. The method further includes generating a unique drop rule for dropping a set of packets based on an implicit deny rule. The implicit deny rule determines a drop for the plurality of packets. Thereafter, a sequence for the unique drop rule in the plurality of drop rules is determined based on dropping of the plurality of packets. Accordingly, the unique drop rule is deployed in the sequence of drop rules.

In another embodiment, a system for generating dynamic rules for a network firewall, is provided. The system includes a network interface, a processor coupled to the network interface, and a memory communicatively coupled to the processor and having processor instructions stored thereon. The processor instructions cause the processor, on execution to apply a plurality of drop rules to a plurality of packets that are received at the network interface. The plurality of drop rules are sequentially arranged rules and such rules determine at least one of drop and dropping of a packet based on corresponding tracking information. The system generates a unique drop rule for dropping a set of packets based on an implicit deny rule. The implicit deny rule determines a drop for the plurality of packets. Thereafter, a sequence for the unique drop rule in the plurality of drop rules is determined based on dropping of the plurality of packets. Accordingly, the unique drop rule is deployed in the sequence of drop rules.

In yet another embodiment, a non-transitory computer-readable storage medium is disclosed. The non-transitory computer-readable storage medium has instructions stored thereon, a set of computer-executable instructions causing the system for generating dynamic rules for a network firewall, is provided. The network firewall involves applying a plurality of drop rules to a plurality of packets that are received at a network interface. The plurality of drop rules are sequentially arranged rules and such rules determine at least one of allowance and dropping of a packet based on corresponding tracking information. Then, a unique drop rule is generated for dropping a set of packets based on an implicit deny rule. The implicit deny rule determines a drop for the plurality of packets. Thereafter, a sequence for the unique drop rule in the plurality of drop rules is determined based on dropping of the plurality of packets. Accordingly, the unique drop rule is deployed in the sequence of drop rules.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
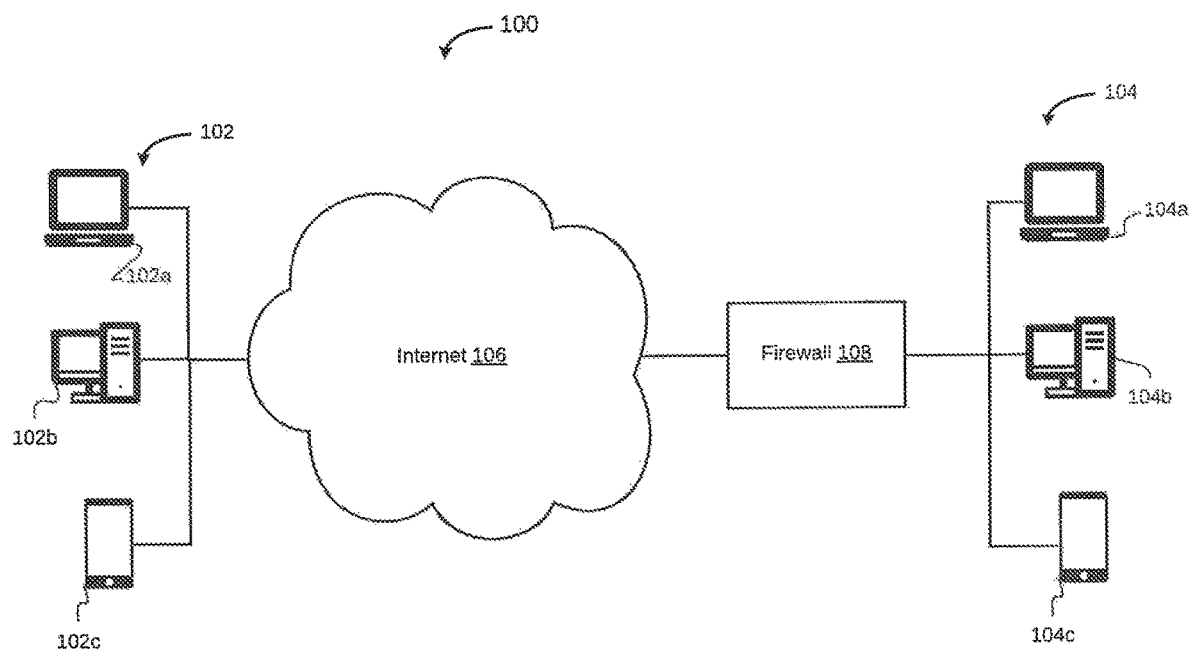
FIG. 1 illustrates a communication network (that is exemplary) in which various embodiments may be employed.

Additional illustrative embodiments are listed below. In one embodiment, a communication network 100, in which various embodiments may be employed, is provided in FIG. 1. Communication network 100 may be a wired or a wireless network established between multiple communication devices. Communication network 100 includes a source network 102 and a destination network 104 that are connected to each other via Internet 106. Source network 102 includes one or more source devices, for example, a source device 102a, a source device 102b, and a source device 102c.

Each of the one or more source devices may be a computing device that is capable of performing packet based transmission of data. Examples of a source device may include, but are not limited to personal computer(s), server(s), fax machines, printers, scanners, various mobile devices such as cellular telephones, smartphones (e.g., APPLE® (PHONE® smartphone, BLACKBERRY® smartphone, ANDROID® based phones, etc.), tablet computers, eBook readers (AMAZON® KINDLE® ereader, NOOK® tablet computer, etc.), laptop computers, notebooks, gaming consoles (MICROSOFT® XBOX® gaming console, NINTENDO® DS® gaming console, SONY® PLAYSTATION® gaming console, etc.), or the like.

Destination network 104 also includes one or more destination devices, for example, a destination device 104a, a destination device 104b, and destination device 104c. One of the one or more source devices may transmit data, via Internet 106, to one of the one or more destination devices, which is capable of receiving packet based transmission. Examples of the one or more destination devices are similar to one or more source devices.

Each of the one or more destination devices is further connected to a firewall 108 that is capable of screening incoming data stream of packets from source network 102 to destination network 104. Firewall 108 may be implemented as a hardware, a software, a firmware, or a combination thereof. In order to enable screening of the packets, firewall 108 may include modules for applying policies and rules to the packets. In an embodiment, firewall 108 may include an Access Control List (ACL), referred to as an ACL engine that performs a simple comparison of various matching criteria of an incoming Internet Protocol (IP) packet—typically source, destination, port and protocol—to each rule in a set of rules that are arranged in a sequence. Based upon this comparison, an incoming IP packet is either allowed or denied into destination network 104. Firewall 108 may be implemented based on embodiments described in following figures.

Figure 2:
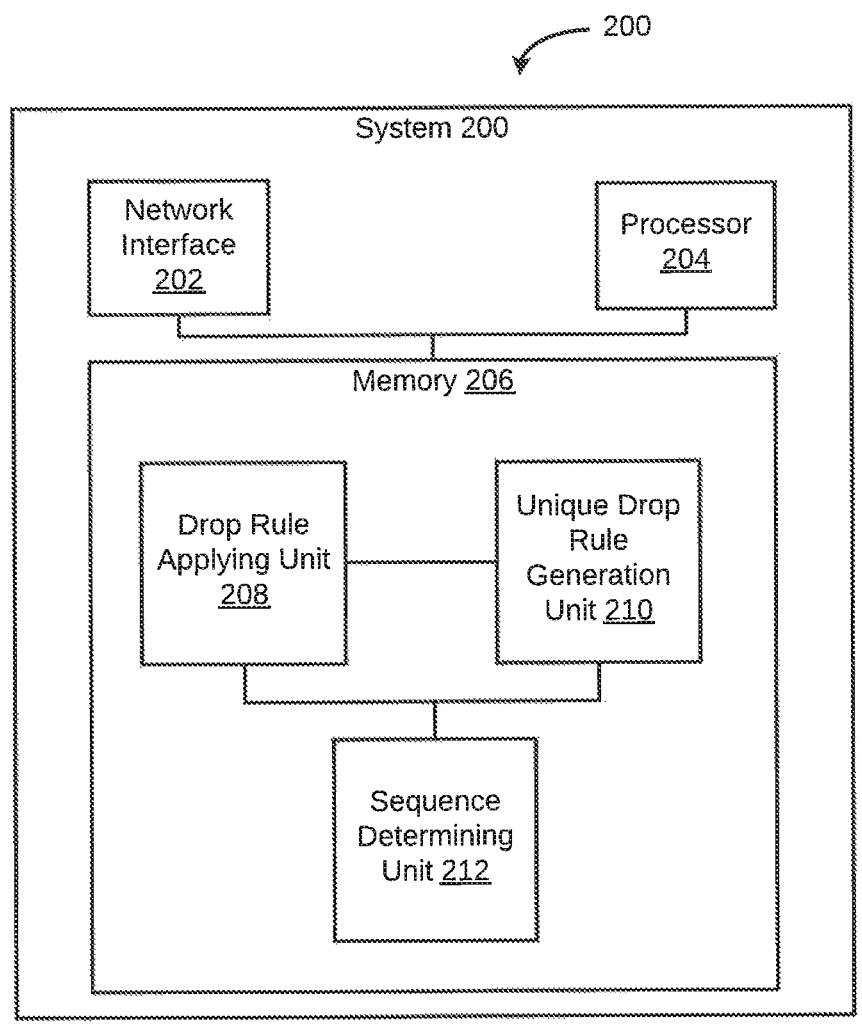
FIG. 2 illustrates a block diagram of a system for generating dynamic rules for firewall policy, in accordance with an embodiment.

Referring now to FIG. 2, a block diagram of a system 200 for generating dynamic rules for firewall policy is illustrated, in accordance with an embodiment. System 200 may be implemented as a network firewall, such as, firewall 108 in FIG. 1. System 200 may include a network interface 202 that is configured to receive packets that are transmitted by a source network (for example, source network 102). In other words, network interface 202 receives packets that are incoming. In an embodiment, network interface 202 may be an ingress interface placed at a receiving end of a network firewall to receive packets of data. Network interface 202 further provides the received packets to a processor 204 and a memory 206 for further processing. Processor 204 is configured to process software instructions for system 200 that may be stored in memory 206. To this end, processor 204 is communicatively coupled to memory 206.

Memory 206 may be a non-volatile memory or a volatile memory. Examples of non-volatile memory, may include, but are not limited to a flash memory, a Read Only Memory (ROM), a Programmable ROM (PROM), Erasable PROM (EPROM), and Electrically EPROM (EEPROM) memory. Examples of volatile memory may include, but are not limited Dynamic Random Access Memory (DRAM), and Static Random-Access memory (SRAM). Processor 204 executes the software instructions to enable functioning of system 200. Functioning of these elements is further explained in detail in conjunction with FIG. 3.

Memory 206 includes a drop rule applying unit 208, configured to apply drop rules to the packets that are incoming at system 200. The drop rules are sequentially arranged policies or rules that are applied to the packets, in order to determine, whether to allow one or more of the packets to reach a destination network or to drop one or more of the packets before they reach the destination network. In other words, drop rule applying unit 208 decides whether to permit or decline entrance of a packet into the destination network. The drop rules may be based on tracking information of the packets, such as, source/destination IP addresses and source/destination ports. Thus, drop rule applying unit 208 enables application of the drop rules by monitoring and analyzing tracking information associated with the packets. In an embodiment, the drop rules may be sequentially arranged based on a priority position of each drop rule. The priority associated with each drop rule may be determined based on a unique mechanism.

Drop rule applying unit 208 is further coupled to communicate with a unique drop rule generation unit 210, which is configured to generate a unique drop rule that is defined to drop a set of packets based on an implicit deny rule. The implicit deny rule determines a drop for the packets in case large amount of packets pass the drop rules and no non-permitted packets are identified. In such a scenario, the implicit deny rule provides denial service for further rule application. Unique drop rule generation unit 210 is further connected to a sequence determining unit 212 that is configured to determine a sequence for the unique drop rule in the set of drop rules based on dropping of one or more packets that are incoming. This is further explained in detail in conjunction with FIG. 4 and FIG. 5.

Figure 3:
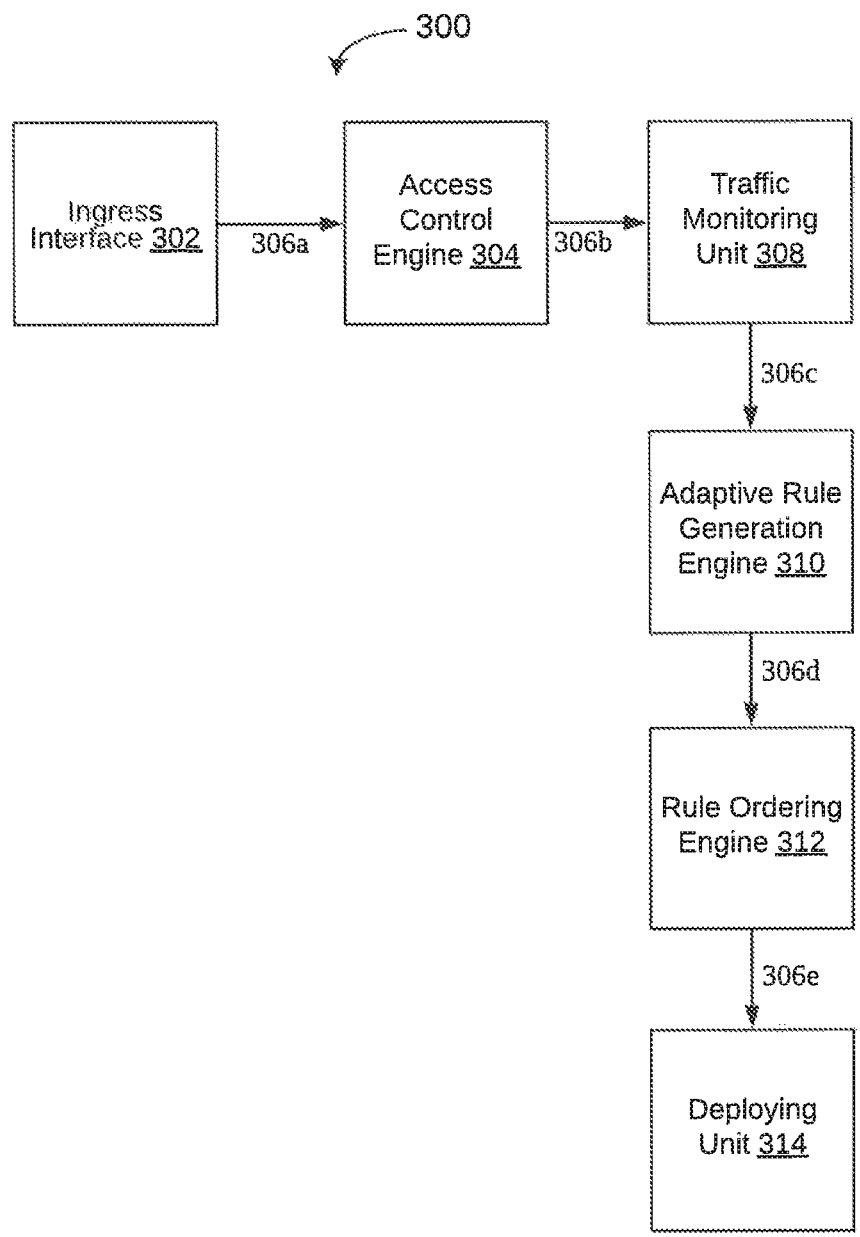
FIG. 3 illustrates a block diagram of a system for generating dynamic rules for firewall policy, in accordance with another embodiment.

Referring now to FIG. 3, a block diagram of a system 300 for providing dynamic rules for firewall policy is illustrated, in accordance with an embodiment. System 300 may be implemented as a network firewall, for example, firewall 108 in FIG. 1.

System 300 includes an ingress interface 302 that receives packets from a source network (for example, source network 102). Ingress interface 302 may be implemented as a network interface device, for example, a switch or a router. Ingress interface 302 is configured to receive the packets from the source network and provide the received packets to an access control engine 304, via a connection line 306a. These packets are analysed at access control engine 304 and one or more drop rules or policies are applied. Application of the policies result in allowance or dropping of one or more packets, before they reach a destination network. The drop rules or the policies are commands for filtering the packets based on matching or differentiating criteria.

Access control engine 304 may further be connected to a traffic monitoring unit 308 via a connection line 306b. Traffic monitoring unit 308 may be configured to monitor the packets based on a tracking information. The tracking information may include source/destination IP addresses, source/destination port details, and a rule number for matching the packet to a corresponding drop rule. The tracking information is utilized for allowance or dropping of one or more packets.

Based on the monitoring of packets at traffic monitoring unit 308, a unique drop rule for dropping the packet is dynamically generated at an adaptive rule generation engine 310, which is coupled to traffic monitoring unit 308, via, a connection line 306c. Adaptive rule generation engine 310 is configured to analyze packets dropped at traffic monitoring unit 308 due to an implicit deny rule (or an explicit rule that drops packets from any source IP with any destination IP with any service) and accordingly generate a unique drop rule for dropping a specific set of packets. The "implicit deny rule" is the rule which drops all the packets that didn't match any other rule and typically resides at last in the sequence. In cases where large amount of packets gets dropped at this implicit deny rule, the processing time will increase. In such a scenario, to make early decision for dropping of a non-permitted packet a unique drop rule is generated. The unique drop rule is defined to ensure dropping of non-permitted packets at early stage in lookup before implicit deny rule.

Thereafter, the unique drop rule as generated at adaptive rule generation engine 310 is positioned by a rule ordering engine 312, which is coupled to adaptive rule generation engine 310, via, a connection line 306d. Rule ordering engine 312 is configured to order and place the generated unique drop rule at a determined position in the sequential processing of the drop rules or the policies. In an embodiment, rule ordering engine 312 positions the unique drop rule by analyzing a hit count of each drop packet based on the implicit deny rule. In an embodiment, positioning may include repositioning of the unique drop rule, with respect to its earlier position. Rule ordering engine 312 then determines the position of generated unique drop rule at the relevant order. In this scenario, connection line 306d between adaptive rule generation engine 310 and rule ordering engine 312, are utilized for transmission of information such as the hit count and sequence of the drop rules.

Thereafter, a deploying unit 314 (coupled to rule ordering engine 312 via a connection line 306e) is configured to deploy the generated unique drop rule at the determined position (based on a priority policy, determined using a unique mechanism) by utilizing a buffer to avoid drop in flow of packets and a moderating factor through configuration. The buffer holds the packets till the time policy installation gets completed and a timeout period is configured to define an easing period between installation of the unique drop rule in the sequence of the drop rules. Accordingly, implementation of the unique drop rule is dynamically achieved.

Connection lines 306a-e may be implemented as network connection protocols such as Serial Advanced Technology Attachment (SATA), Integrated Drive Electronics (IDE), IEEE-1394, Universal Serial Bus (USB), fiber channel, Small Computer Systems Interface (SCSI), STD Bus, RS-232, RS-422, RS-485, I2C, SPI, Microwire,1-Wire, IEEE 1284, Intel QuickPathlnterconnect, InfiniBand, PCIe, etc. using standard data connections means such as wireless or wired.

Figure 4:
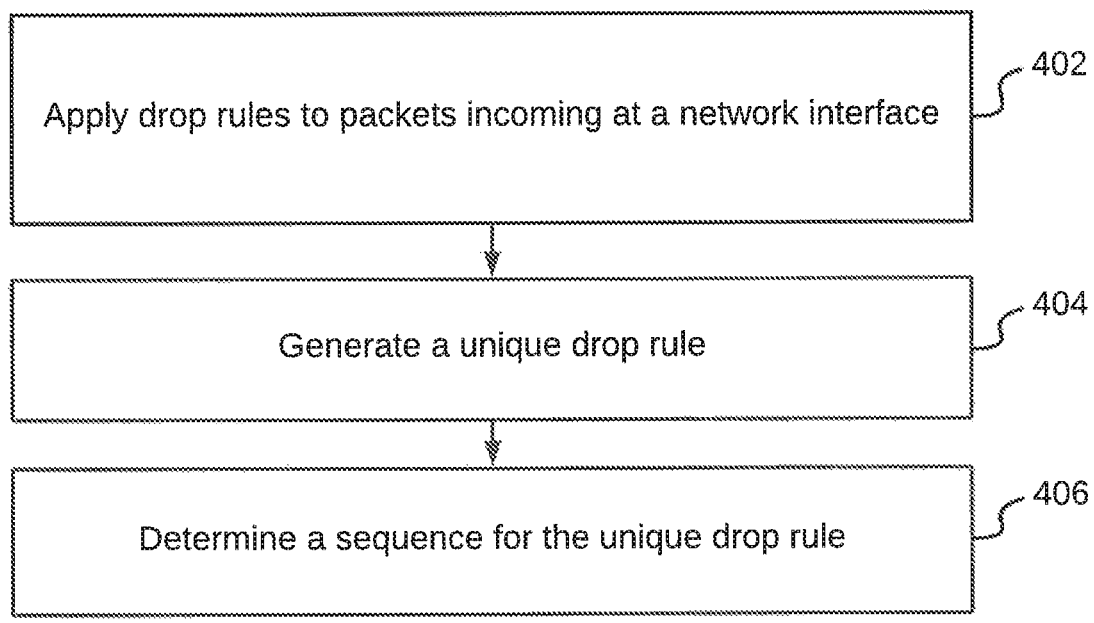
FIG. 4 illustrates a flowchart of a method for generating dynamic rules for a firewall policy at a network interface, in accordance with an embodiment.

Referring now to FIG. 4, a flowchart of a method for generating dynamic rules for a firewall policy at a network interface is illustrated, in accordance with an embodiment. In an embodiment, dynamic rules for a firewall policy may be generated for a global rule base. At step 402, drop rules are applied to packets incoming at a network interface placed between a source and a destination network. The drop rules are policies, which are sequentially arranged, for allowing or dropping of one or more of the packets. The drop rules may be sequentially arranged based on a priority position of each drop rule. The priority associated with each drop rule may be determined based on a unique mechanism as described further. The drop rules may be based on a tracking information related to the packets, such as, source/destination IP addresses and/or source/destination ports. Such drop rules are applied to the packets for the purpose of matching.

Thereafter, at step 404, a unique drop rule is generated for dropping a set of packets based on an implicit deny rule. The implicit deny rule may be a policy that is applied to the packet which did not match any of the drop rules and this rule acts to drop such packets. This unique drop rule is generated if the hit count for one specific packet is found to be higher than the average hit count of the rules above it. This unique drop will hold source IP Address, destination IP address, and Transmission Control Protocol/Internet Protocol (TCP/IP) destination port or service, same as that of the specific packets, for which drop hit count were found to be higher. This unique drop rule will have action as drop.

Subsequent to generation of the unique drop rule, a sequence for the unique drop rule in the drop rules is determined at step 406. The sequence may be determined based on dropping of one or more packets based on the implicit deny rule. Accordingly, a hit count of the dropped packets is analyzed and then position of the unique drop rule is calculated. Thereafter, deployment of the unique drop rule is executed. This may be implemented by utilizing a buffer value to avoid drop in the flow of packets, and a moderating factor through configuration. Here the buffer holds the packets till the time policy installation gets completed and a timeout period is configured to define an easing period between installation of the unique drop rule between the existing set of drop rules.

Figure 5:
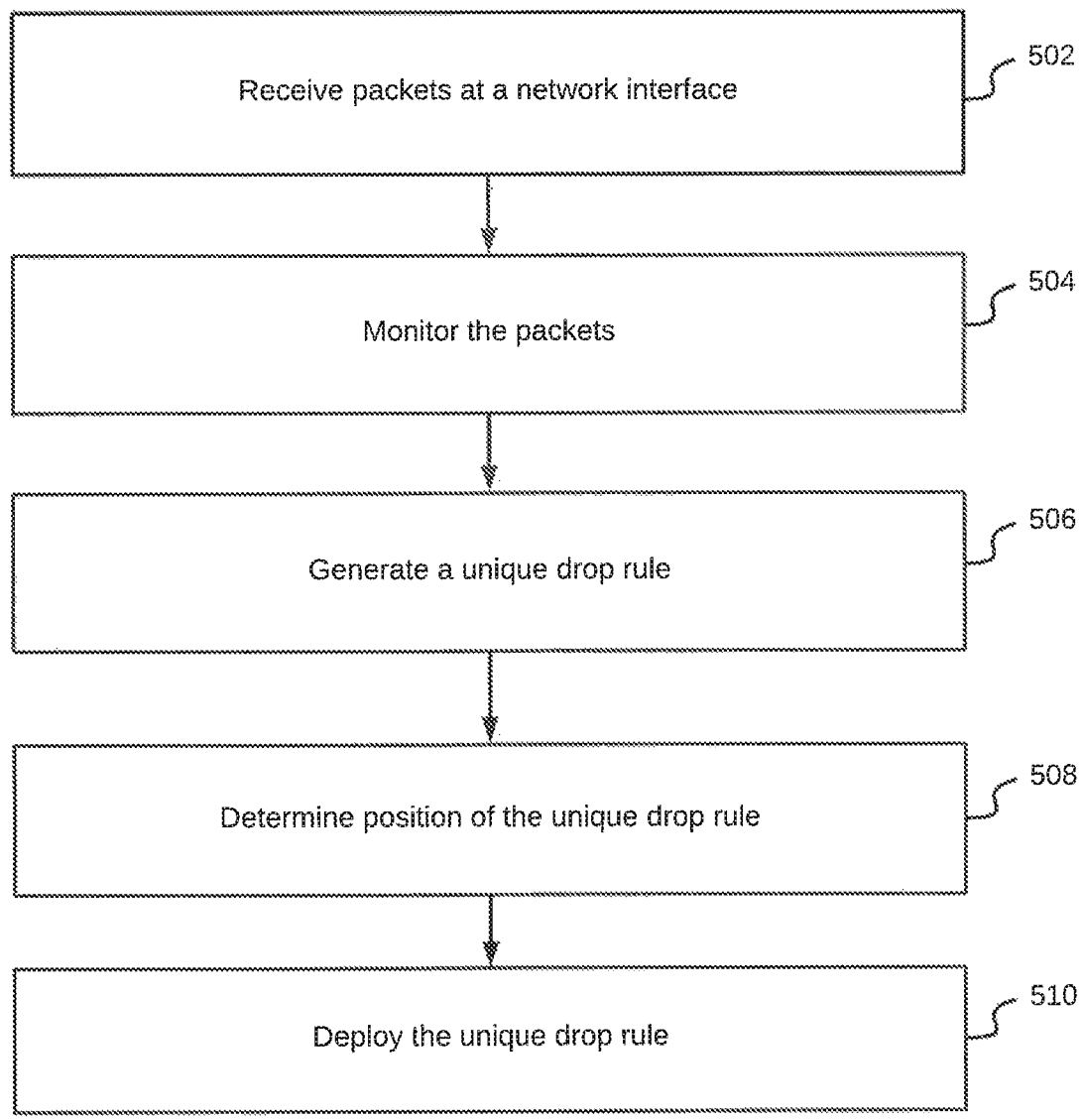
FIG. 5 illustrates a flowchart of a method for generating dynamic rules for a firewall policy at a network interface, in accordance with another embodiment.

Referring now to FIG. 5, a flowchart of a method for generating dynamic rules for a firewall policy at a network interface is illustrated, in accordance with another embodiment. At step 502, packets are received at a network interface, such as, an ingress interface and drop rules are applied to the packets. The drop rules define whether to allow or drop a packet based on tracking information of the packets, such as source/destination IP addresses and source/destination ports. Then, at step 504, the packets are monitored to observe the tracking information and a rule number matching to the packets. Based on a matching rule, corresponding action of allowance or dropping of a packet number is identified.

Thereafter, at step 506 a unique drop rule is generated for dropping a specific set of packets. The unique drop rule is based on the tracking information of the specific set of packets and an implicit deny rule. The implicit deny rule may be a policy that is applied when large amount of packets that are incoming are permitted, and no drop situation arises. Post generation of the unique drop rule, at step 508, a position of the generated unique drop rule is determined. The position of the unique drop rule is identified based on hit count of each drop packet because of the implicit deny rule. Accordingly, position of the unique drop rule is identified in given sequence of the drop rules.

Subsequently, at step 510, the unique drop rule is deployed at the determined position within the sequence of drop rules. In order to deploy the unique drop rule, a buffer value is utilized to avoid drop in a flow of packets and a moderating factor is configured. The buffer holds the specific packets till the time policy installation gets completed and a timeout period is configured to define an easing period between installations of the unique drop rule in the sequence of the drop rules.

Figure 6:
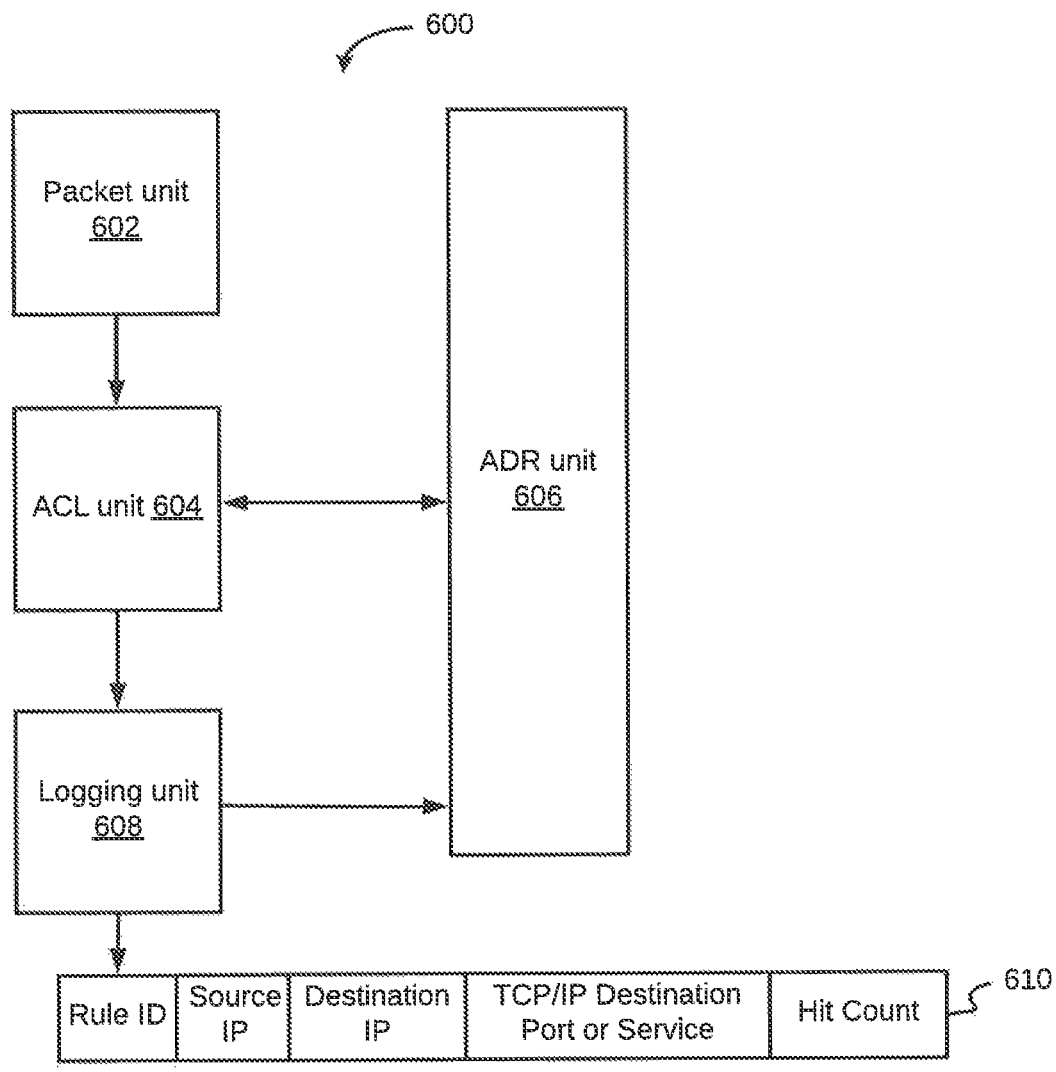
FIG. 6 illustrates a firewall architecture, in accordance with an embodiment.

Referring now to FIG. 6, a firewall architecture 600 in which various embodiments may function, is illustrated. Firewall architecture 600 includes a packet unit 602 for transmission of packets into an Access Control List (ACL) unit 604. ACL unit 604 may be similar to access control engine 304 as illustrated in FIG. 3. ACL unit 604 filters packets that are incoming, based on drop rules. ACL unit 604 coordinates with an Adaptive Drop Rule (ADR) unit 606 for monitoring and filtering of the packets. ADR unit 606 is configured to change sequence of a rule or a policy such that highly dropping packets gets earlier hit and do not go for longer lookup in the policy. ADR unit 606 may achieve this by monitoring logs that are recorded at a logging unit 608.

Logging unit 608 records all packet flowing through firewall architecture 600 by keeping information about source IP address, destination IP address, destination port (service) and rule numbers at a log table 610. Log table 610 may also maintain a record of where a packet is matched and configured action as performed. Based on these logs, ADR unit 606 may build a unique drop rule for dropping a specific type of traffic (which includes packets), and place the unique drop rule ahead of other drop rules that may have lesser hits than a newly build rule. Overall in this manner, more matching packets may get matched ahead of least matching packets and this in turn may improve performance by reducing the processing requirements.

In accordance with an example, various modules or units in firewall architecture 600 may function such that ACL unit 604 may start filtering packets as per drop rules based actions, such as, allow, drop, or deny. In conjunction, ADR unit 606 monitors the packets based on an implicit deny rule or a cleanup rule or a last drop rule in ACL unit 604 through logging unit 608. In this example, hit count may relate to total count of hits (matched packets) received by any rule in ACL unit 604 for a given period or from a time counters are refreshed till a time T.

Logging unit 608 may have mechanism to save hit count of all packets dropping based on the implicit deny rule. This mechanism may track hit count for each packet. Identification of packets to increment hit count may be done using tuple of source IP address, destination IP address, and destination port from TCP/IP packet at network layer.

ADR unit 606 fetches data from logging unit 608 on real time basis to check whether any specific type of packet's hit count based on the implicit deny rule has increased to more than an average of hit counts of the drop rules starting from the previous rule from the implicit deny rule. In case this is true, then ADR unit 606 creates a drop rule for this specific type of packets and places it above the drop rules whose average of hit count is lesser than the hit count of given packets that got dropped based on the implicit deny rule.

The mechanism may further be executed such that total rules in ACL unit 604 may be represented as N, with $N^{th}$ rule being the implicit deny rule. Further, 'i' may represent order of a rule in the rule base, and a rule may be denoted as rule(i). In this case, h(i) may denote the hit count of rule(i). In addition, summation (denoted as S) of the hit counts for the rules starting from rule preceding the implicit deny rule till the $i^{th}$ rule may be represented by equation 1 given below:

$$S = h(N-1) + h(N-2) + \ldots + h(N-i) \quad (1)$$

The average (denoted as A) of the hit counts may be computed using equation 2 given below:

$$A = \frac{S}{(N-1)-i} \quad (2)$$

In the above case, hit count against any specific type of packets within the implicit deny rule may be denoted as Y, such that, Y>A. If Y is greater than A, then ADR unit 606 may create a new rule with drop action matching with tuple of packet (source IP, destination IP, and TCP/IP destination port or service) having hit count Y. This may place the newly created rule at the position T in the rule order, just above the rule(i).

In case the above criteria match for two rules, i.e., $i^1$ and $i^2$ for example, and if $i^1$ is greater than $i^2$, then the newly created rule may be placed at $i^2$ position, that is just above the rule($i^2$), otherwise it may be placed at $i^1$ position, that is just above the rule($i^1$).

The above mechanism may be implemented for newly created rule by checking out hit count and running the above methodology to reposition or delete the same rule, as required.

The given scenario is advantageous in reducing total number of rule lookups. For example, consider that total rule lookup is L1 for a given time period T, then for the same period and considering same amount and pattern of packets but with this mechanism in place, the total rule lookup is L2. In this case, L2 will be less than L1.

In this mechanism we may assume that a firewall has a single rule-base that includes N rules. However, the mechanism may work well with the firewall that maintains multiple rule bases for given interfaces. In this case, the mechanism works separately for individual rule base.

Figure 7:
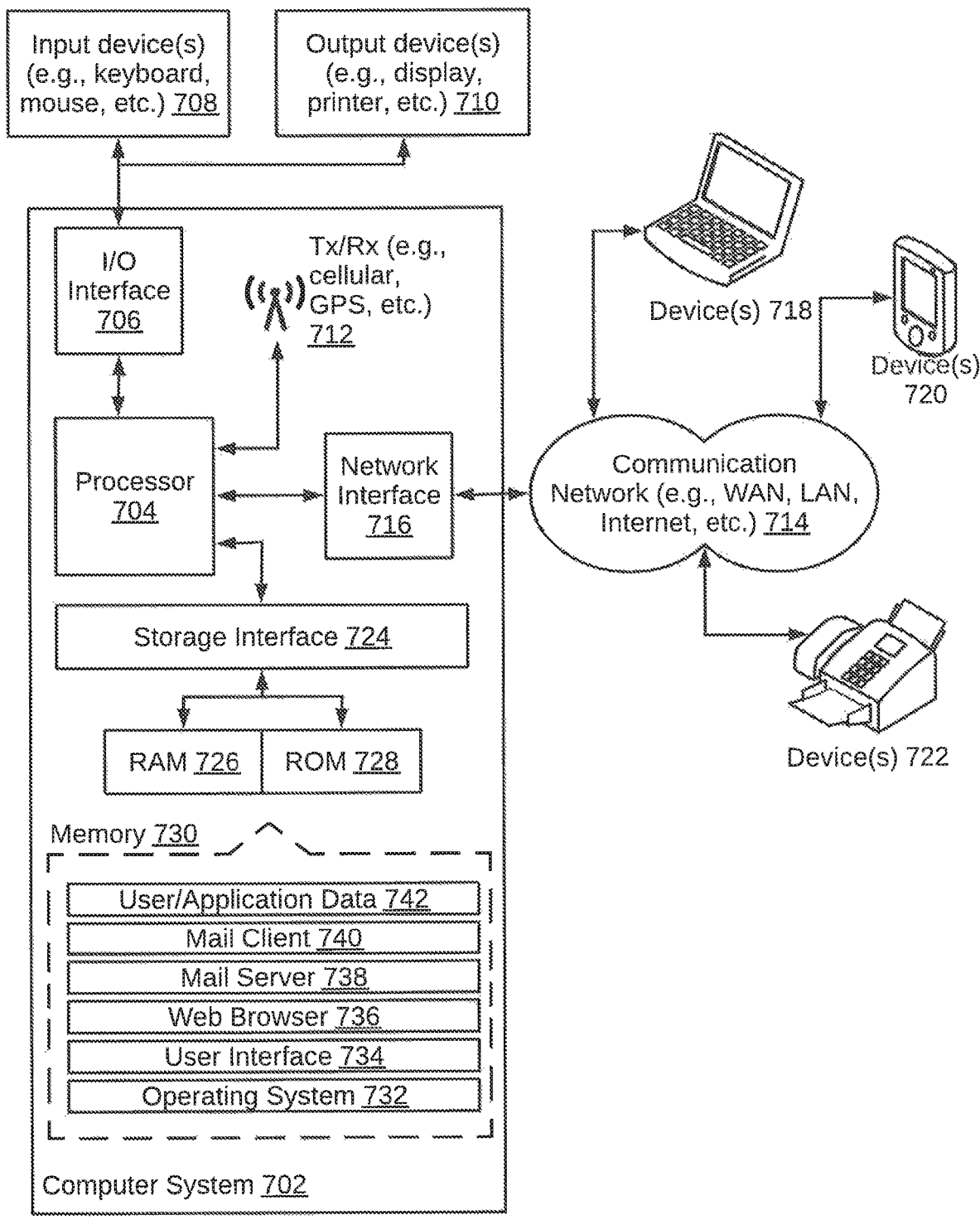
FIG. 7 illustrates a block diagram of an exemplary computer system for implementing various embodiments.

Referring now to FIG. 7, a block diagram of an exemplary computer system for implementing various embodiments is illustrated. Computer system 702 may include a central processing unit ("CPU" or "processor") 704 that includes at least one data processor for executing program components for executing user-generated requests or system-generated requests. A user may include a person, a person using a device such as those included in this disclosure, or such a device itself. Processor 704 may include specialized processing units such as integrated system (bus) controllers, memory management control units, floating point units, graphics processing units, digital signal processing units, etc. Processor 704 may include a microprocessor, such as AMD® ATHLON® microprocessor, DURON® microprocessor OR OPTERON® microprocessor, ARM's application, embedded or secure processors, IBM® POWERPC®, INTEL'S CORE® processor, ITANIUM® processor, XEON® processor, CELERON® processor or other line of processors, etc. Processor 704 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 704 may be disposed in communication with one or more input/output (I/O) devices via an I/O interface 706. I/O interface 706 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n /b/g/n/x, Bluetooth, cellular (e.g., code-division multiple access (CDMA), high-speed packet access (HSPA+), global system for mobile communications (GSM), long-term evolution (LTE), WiMAX, or the like), etc.

Using I/O interface 706, computer system 702 may communicate with one or more I/O devices. For example, an input device 708 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. An output device 710 may be a printer, fax machine, video display (e.g., cathode ray tube (CRT), liquid crystal display (LCD), light-emitting diode (LED), plasma, or the like), audio speaker, etc. In some embodiments, a transceiver 712 may be disposed relating to processor 704. Transceiver 712 may facilitate various types of wireless transmission or reception. For example, transceiver 712 may include an antenna operatively connected to a transceiver chip (e.g., TEXAS® INSTRUMENTS WILINK WL1283® transceiver, BROADCOM® BCM4550lUB8® transceiver, INFINEON TECHNOLOGIES® X-GOLD 618-PMB9800® transceiver, or the like), providing IEEE 802.11a/b/g/n, Bluetooth, FM, global positioning system (GPS), 2G/3G HSDPA/HSUPA communications, etc.

In some embodiments, processor 704 may be disposed in communication with a communication network 714 via a network interface 716. Network interface 716 may communicate with communication network 714. Network interface 716 may employ connection protocols including, without limitation, direct connect, Ethernet (e.g., twisted pair 50/500/5000 Base T), transmission control protocol/internet protocol (TCP/IP), token ring, IEEE 802.11a/b/g/n/x, etc. Communication network 714 may include, without limitation, a direct interconnection, local area network (LAN), wide area network (WAN), wireless network (e.g., using Wireless Application Protocol), the Internet, etc. Using network interface 716 and communication network 714, computer system 702 may communicate with devices 718, 720, and 722. The devices may include, without limitation, personal computer(s), server(s), fax machines, printers, scanners, various mobile devices such as cellular telephones, smartphones (e.g., APPLE® IPHONE® smartphone, BLACKBERRY® smartphone, ANDROID® based phones, etc.), tablet computers, eBook readers (AMAZON® KINDLE® e reader, NOOK® tablet computer, etc.), laptop computers, notebooks, gaming consoles (MICROSOFT® XBOX® gaming console, NINTENDO® DS® gaming console, SONY® PLAYSTATION® gaming console, etc.), or the like. In some embodiments, computer system 702 may itself embody one or more of the devices.

In some embodiments, processor 704 may be disposed in communication with one or more memory devices (e.g., RAM 726, ROM 728, etc.) via a storage interface 724. Storage interface 724 may connect to memory 730 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

Memory 730 may store a collection of program or database components, including, without limitation, an operating system 732, user interface application 734, web browser 736, mail server 738, mail client 740, user/application data 742 (e.g., any data variables or data records discussed in this disclosure), etc. Operating system 732 may facilitate resource management and operation of computer system 702. Examples of operating systems 732 include, without limitation, APPLE® MACINTOSH® OS X platform, UNIX platform, Unix-like system distributions (e.g., Berkeley Software Distribution (BSD), FreeBSD, NetBSD, OpenBSD, etc.), LINUX distributions (e.g., RED HAT®, UBUNTU®, KUBUNTU®, etc.), IBM® OS/2 platform, MICROSOFT® WINDOWS® platform (XP, Vista/7/8, etc.), APPLE® 10S® platform, GOOGLE® ANDROID® platform, BLACKBERRY® OS platform, or the like. User interface 734 may facilitate display, execution, interaction, manipulation, or operation of program components through textual or graphical facilities. For example, user interfaces may provide computer interaction interface elements on a display system operatively connected to computer system 702, such as cursors, icons, check boxes, menus, scrollers, windows, widgets, etc. Graphical user interfaces (GUIs) may be employed, including, without limitation, APPLE® Macintosh® operating systems' AQUA® platform, IBM® OS/2® platform, MICROSOFT® WINDOWS® platform (e.g., AERO® platform, METRO® platform, etc.), UNIX X-WINDOWS, web interface libraries (e.g., ACTIVEX® platform, JAVA® programming language, JAVASCRIPT® programming language, AJAX® programming language, HTML, ADOBE® FLASH® platform, etc.), or the like.

In some embodiments, computer system 702 may implement a web browser 736 stored program component. Web browser 736 may be a hypertext viewing application, such as MICROSOFT® INTERNET EXPLORER® web browser, GOOGLE® CHROME® web browser, MOZILLA® FIREFOX® web browser, APPLE® SAFARI® browser, etc. Secure web browsing may be provided using HTTPS (secure hypertext transport protocol), secure sockets layer (SSL), Transport Layer Security (TLS), etc. Web browsers may utilize facilities such as AJAX, ©HTML, ADOBE® FLASH® platform, JAVASCRIPT® programming language, JAVA® programming language, application programming interfaces (APIs), etc. In some embodiments, computer system 702 may implement a mail server 738 stored program component. Mail server 738 may be an Internet mail server such as MICROSOFT® EXCHANGE® mail server, or the like. Mail server 738 may utilize facilities such as ASP, ActiveX, ANSI C++/C#, MICROSOFT .NET® programming language, CGI scripts, JAVA® programming language, JAVASCRIPT® programming language, PERL® programming language, PHP® programming language, PYTHON® programming language, WebObjects, etc. Mail server 738 may utilize communication protocols such as internet message access protocol (IMAP), messaging application programming interface (MAPI), Microsoft Exchange, post office protocol (POP), simple mail transfer protocol (SMTP), or the like. In some embodiments, computer system 702 may implement a mail client 740 stored program component. Mail client 740 may be a mail viewing application, such as APPLE MAIL® mail client, MICROSOFT ENTOURAGE® mail client, MICROSOFT OUTLOOK® mail client, MOZILLA THUNDERBIRD® mail client, etc.

In some embodiments, computer system 702 may store user/application data 742, such as the data, variables, records, etc. as described in this disclosure. Such databases may be implemented as fault-tolerant, relational, scalable, secure databases such as ORACLE® database OR SYBASE® database. Alternatively, such databases may be implemented using standardized data structures, such as an array, hash, linked list, struct, structured text file (e.g., XML), table, or as object-oriented databases (e.g., using OBJECTSTORE® object database, POET® object database, ZOPEO object database, etc.). Such databases may be consolidated or distributed, sometimes among the various computer systems discussed above in this disclosure. It is to be understood that the structure and operation of the any computer or database component may be combined, consolidated, or distributed in any working combination.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Various embodiments of the invention provide a method and system for generating dynamic rules for computer network firewall. The invention enables effective filtering of packets from source network and destination network. The method and system enable improvement in throughput as well as overall performance of the network firewall. This aids in mitigating against denial of service attack. Further, administrative overhead is reduced as work required to re-organize rules is reduced and performance for re-configuring the rule base based on drop packets is improved.

The specification has described a method and system for generating dynamic rules for computer network firewall. The illustrated steps are set out to explain the exemplary embodiments shown, and it should be anticipated that ongoing technological development will change the way functions are performed. Examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein, Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein, The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for generating dynamic rules for a firewall policy, the method comprising:
    applying, by a computing device, a plurality of drop rules to a plurality of packets received at a network interface, wherein the plurality of drop rules are sequentially arranged and determine at least one of allowance and dropping of a packet of the plurality of packets based on a tracking information;
    generating, by the computing device, a unique drop rule for dropping a set of packets from the plurality of packets based on an implicit deny rule, wherein the implicit deny rule determines a drop for each of the plurality of packets; and
    determining, by the computing device, a sequence for the unique drop rule in the plurality of drop rules based on dropping of the set of packets.

2. The method of claim 1, wherein the network interface is an ingress interface at a communication network.

3. The method of claim 1, wherein the tracking information includes source or destination IP addresses of the plurality of packets.

4. The method of claim 1, wherein the tracking information includes source or destination port of the plurality of packets.

5. The method of claim 1, wherein the implicit deny rule comprises dropping of the plurality of packets based on implicitly denied tracking information.

6. The method of claim 1, wherein the plurality of drop rules are sequentially arranged based on a priority position of each drop rule from the plurality of drop rules.

7. The method of claim 1, wherein determining the sequence for the unique drop rule comprises:
    analyzing the set of packets in response to the dropping;
    determining a hit count of the set of packets; and
    positioning the unique drop rule based on a higher hit count value amongst the plurality of drop rules.

8. The method of claim 1 further comprises:
    determining a buffer value to hold the set of packets based on positioning of the unique drop rule;
    configuring a timeout period for installation of the unique drop rule amongst the plurality of drop rules; and
    deploying the unique drop rule based on the buffer value and the timeout period.

9. A system for generating dynamic rules for a firewall policy, the system comprising:
    a network interface;
    a processor coupled to the network interface;
    a memory communicatively coupled to the processor and having processor instructions stored thereon, causing the processor, on execution to:
        apply a plurality of drop rules to a plurality of packets received at a network interface, wherein the plurality of drop rules are sequentially arranged and determine at least one of allowance and dropping of a packet of the plurality of packets based on a tracking information;

generate a unique drop rule for dropping a set of packets from the plurality of packets based on an implicit deny rule, wherein the implicit deny rule determines an drop for each of the plurality of packets; and determine a sequence for the unique drop rule in the plurality of drop rules based on dropping of the set of packets.

10. The system of claim 9, wherein the network interface is an ingress interface at a communication network.

11. The system of claim 9, wherein the tracking information includes source or destination IP addresses of the plurality of packets.

12. The system of claim 9, wherein the tracking information includes source or destination port of the plurality of packets.

13. The system of claim 9, wherein the implicit deny rule comprises dropping of the plurality of packets based on implicitly denied tracking information.

14. The system of claim 9, wherein the plurality of drop rules are sequentially arranged based on a priority position of each drop rule from the plurality of drop rules.

15. The system of claim 9, wherein to determining the sequence for the unique drop rule, the processor instruction are further configured to:

analyze the set of packets in response to the dropping;
determine a hit count of the set of packets; and
position the unique drop rule based on a higher hit count value amongst the plurality of drop rules.

16. The system of claim 9, wherein the processor instructions further cause the processor to:

determine a buffer value to hold the set of packets based on positioning of the unique drop rule;
configure a timeout period for installation of the unique drop rule amongst the plurality of drop rules; and
deploy the unique drop rule based on the buffer value and the timeout period.

17. A non-transitory computer-readable storage medium comprising a set of computer executable instructions causing a system for generating dynamic rules for a firewall policy that includes one or more processors to perform steps including:

applying a plurality of drop rules to a plurality of packets received at a network interface, wherein the plurality of drop rules are sequentially arranged and determine at least one of allowance and dropping of a packet of the plurality of packets based on a tracking information;

generating unique drop rule for dropping a set of packets from the plurality of packets based on an implicit deny rule, wherein the implicit deny rule determines a drop for each of the plurality of packets; and determining a sequence for the unique drop rule in the plurality of drop rules based on dropping of the set of packets.

* * * * *